United States Patent [19]
Bole

[11] 3,724,260
[45] Apr. 3, 1973

[54] LENS FRANGIBILITY TESTING APPARATUS

[75] Inventor: Hamilton B. Bole, Sturbridge, Mass.

[73] Assignee: American Optical Corporation, Southbridge, Mass.

[22] Filed: Apr. 19, 1972

[21] Appl. No.: 245,441

[52] U.S. Cl. ........................... 73/12, 73/79, 73/87
[51] Int. Cl. .................................................. G01n 3/62
[58] Field of Search .......................... 73/12, 79, 87

[56] References Cited

UNITED STATES PATENTS

| | | | |
|---|---|---|---|
| 2,264,412 | 12/1941 | Shindel | 73/87 X |
| 2,281,324 | 4/1942 | Preston | 73/12 |
| 2,648,975 | 8/1953 | Eves | 73/12 |
| 2,755,658 | 7/1956 | Brown | 73/12 |
| 3,488,991 | 1/1970 | Dietert et al. | 73/12 |

Primary Examiner—Charles A. Ruehl
Attorney—William C. Nealon et al.

[57] ABSTRACT

Drop ball apparatus for testing the frangibility of a lens including a base having an elongated hollow tower extending vertically therefrom with lens supporting means in the tower adjacent the base and a receptacle for receiving and guiding a steel ball to a drop point adjacent the uppermost end of the tower. A guideway along one side of the tower contains a lift rod normally having its uppermost end disposed intermediately of the height of the tower when the rod is located at a lowermost position in the guideway. A test ball placed upon the uppermost end of the lift rod through an aperture in the tower is elevated to the ball receptacle by raising of the rod. An opening at the bottom of the tower provides access to the lens holder and a sliding door normally closes this opening.

5 Claims, 4 Drawing Figures

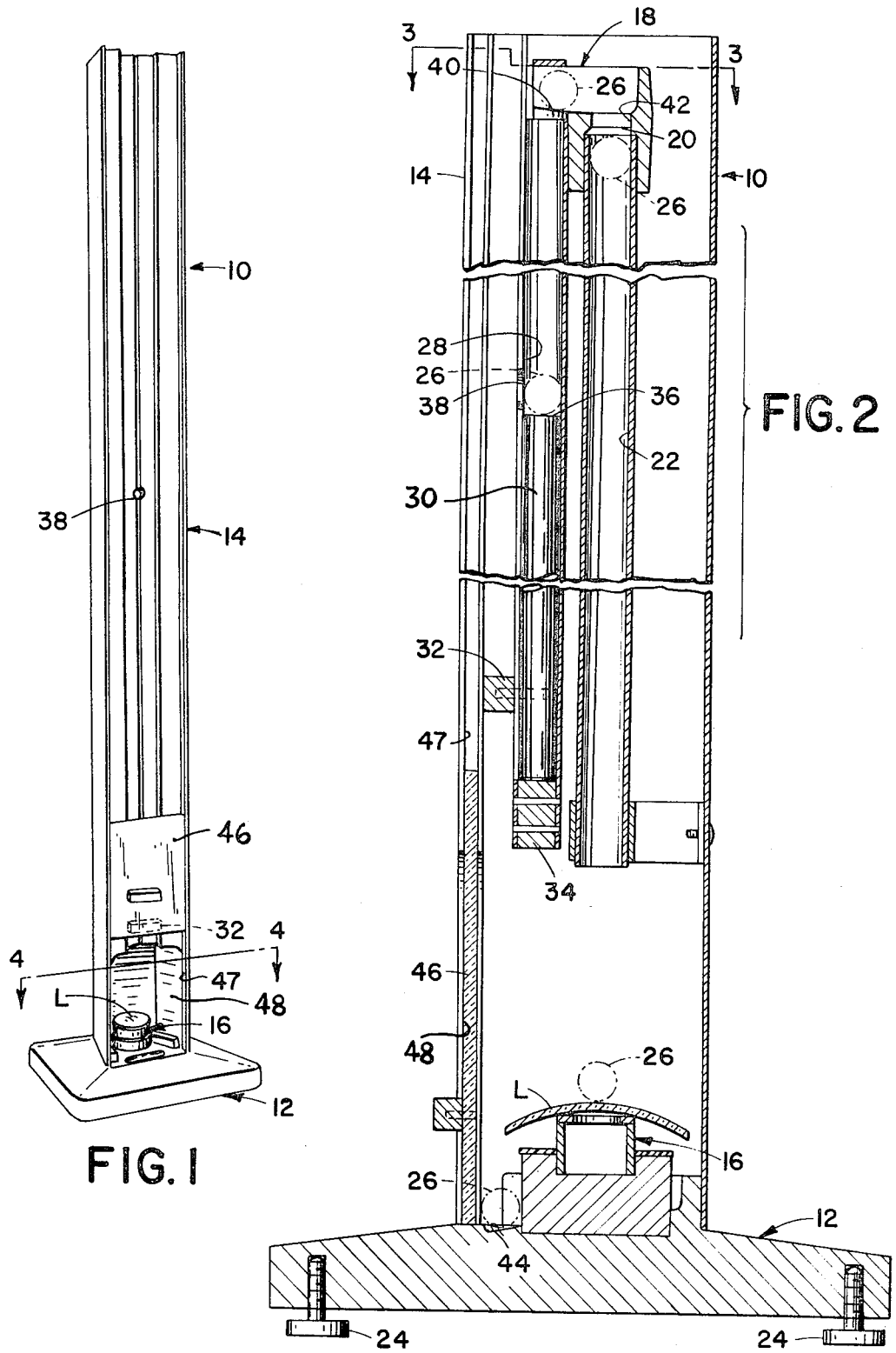

LENS FRANGIBILITY TESTING APPARATUS

BACKGROUND OF THE INVENTION

1. Field of the Invention

Lens frangibility testing apparatus with particular reference to a drop ball lens tester.

2. Description of the Prior Art

A minimal requirement for lens drop ball testing is that a ⅝ inch steel ball be dropped a distance of at least 50 inches upon the surface of a lens under test and that the lens withstand this impact without fracture. This requirement for a 50 inch ball drop, which usually takes place in a towerlike structure, locates the drop point out of easy reach of an operator when the tower apparatus is placed upon a work bench or table top. Heretofor, operators were required to climb stepladders or mount raised platforms to perform each testing operation or to take the alternative of locating the test apparatus upon the floor and bending downwardly with each test operation to remove and replace tested lenses and/or retrieve test balls. In either case, considerable operator fatigue is experienced with its undesirable consequences of inefficient performance and excessive operational costliness.

This invention overcomes undue operator fatigue and its consequences in drop ball testing operations by obviating the requirement for climbing or bending.

SUMMARY OF THE INVENTION

The aforementioned objective and its corolaries are accomplished according to the present invention with drop ball testing apparatus having a ball lifting rod slidably vertically mounted therein. When at its lowermost position in the apparatus, the uppermost end of the rod receives a steel test ball approximately midway of the total height of the apparatus. Elevating the ball to a drop receptacle no less than 50 inches above a lens surface to be tested is accomplished by lifting the rod from a point adjacent its lowermost end an amount considerably less than the whole 50 inches to a point within easy reach of an operator. A large opening adjacent the base of the drop ball testing apparatus provides convenient access to lens supporting means therein when the base of the apparatus is disposed at tabletop height. In preventing injury from flying glass of lenses not surviving the test and/or egress of the test ball, the opening is normally closed by a sliding door. This door also prevents raising of the ball lift rod and accidental dropping of test balls when it is opened.

Details of the present invention will become more readily apparent from the following description when taken in conjunction with the accompanying drawing.

IN THE DRAWING

FIG. 1 is a front elevational view of a preferred embodiment of the invention;

FIG. 2 is a vertical cross-sectional view of the drop ball tester taken along line 2—2 of FIG. 1;

DESCRIPTION OF THE PREFERRED EMBODIMENTS

Figure 3:
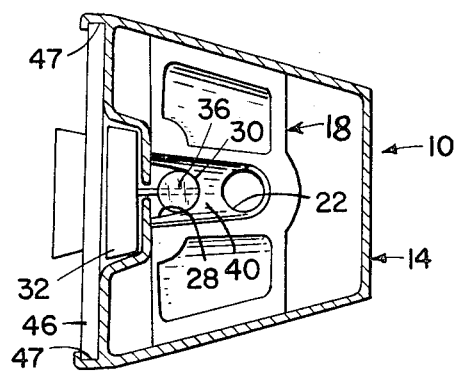
FIG. 3 is a cross-sectional view of the tester taken at line 3—3 of FIG. 2 looking in the direction of the arrows.
Figure 4:
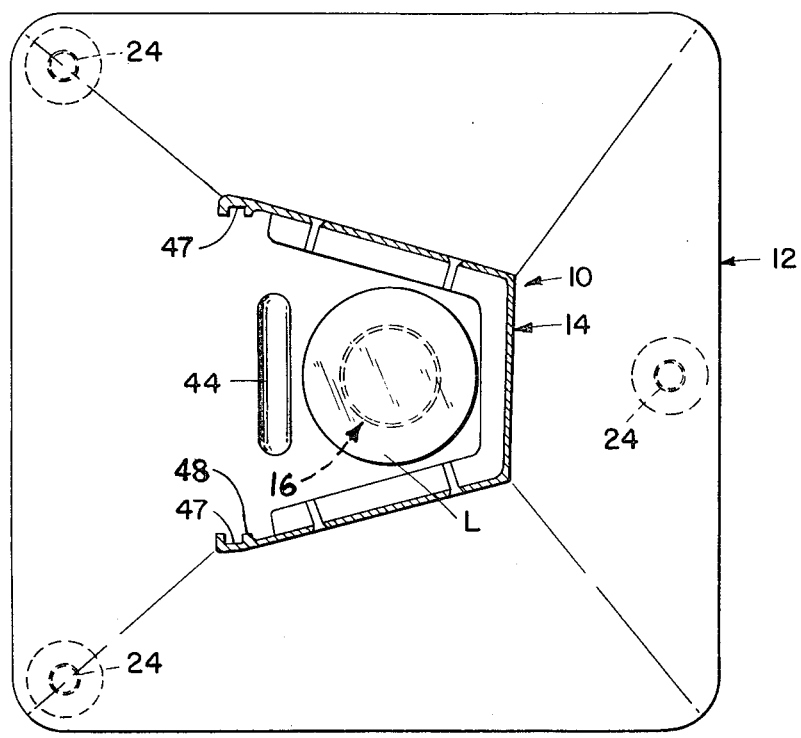
FIG. 4 is another cross-sectional view taken approximately at line 4—4 of FIG. 2.

Referring more particularly to the drawings, it can be seen that drop ball tester 10 comprises base 12 having hollow tower 14 extending vertically therefrom. A lens support 16 is located within the tower 14 adjacent base 12 and a ball receptacle 18 is provided adjacent the uppermost end of the tower 14 for receiving and guiding a test ball to a drop point 20 above lens support 16 (see FIG. 2). A guide tube 22 extending from drop point 20 to within a few inches of lens support 16 prevents appreciable lateral variance of points of impact of balls dropped upon lenses under test.

Leveling screws 24 in base 12 are provided for use in orienting tower 14 and guide tube 22 so that test balls 26 shown in dot-dash outline fall freely downwardly through tube 22 when released thereinto at drop point 20.

It is pointed out that only one ball 26 is used in each lens testing operation. The several broken line illustrations of ball 26 in FIG. 2 are intended to depict various successive positions assumed by the test ball 26 in the course of performing a lens testing operation to be described in greater detail hereinafter.

Tower 14 which is shown as being in the form of a hollow metallic, e.g. aluminum, extrusion has channel 28 into which ball lift rod 30 is slidably fitted for movement upwardly and downwardly in the tower. Handle 32 attached to rod 30 is provided for manipulating the rod. Stop 34 automatically locates the ball receiving uppermost end 36 of rod 30 adjacent to opening 38 intermediately of the height of tower 14 when rod 30 is fully lowered in channel 28.

When rod 30 is lowered against stop 34, a test ball 26 is loaded through opening 38 onto end 36 of the rod for lifting to receptacle 18. The lifting operation is performed by sliding rod 30 upwardly in channel 28 with handle 32. Upon reaching receptacle 18, ball 26 rolls inwardly of the tower along incline 40 into opening 42 to drop point 20. From point 20 the ball falls freely through tube 22 onto lens L thereby effecting the impact test.

Following impact, the test ball 26 comes to rest in holding channel 44 for retrieval and reuse in a subsequent operation.

In order to prevent egress of flying glass from lenses failing to survive the test and/or escape of the test ball, a vertically sliding door 46 normally covers an opening 48 in the bottom of tower 14. Opening 48 provides access to lens support 16 for the loading and unloading of lenses and retrieval of used balls 26 when door 46 is opened. Door 46 is opened and closed by sliding same upwardly and downwardly in channels 47 of tower 14. When open, door 46 covers handle 32 (see FIG. 1) of lift rod 30 thereby preventing accidental lifting of rod 30 and untimely release of a test ball carried by its upper end 36. This permits safe removal and replacement of lenses L, retrieval of ball 26 and/or removal of glass fragments from lenses failing to survive the test.

A typical lens frangibility test begins with the raising of door 46 and placing lens blank L upon support 16. Ball 26 is then inserted into opening 38 to be received by end 36 of lift rod 30 before or after door 46 is lowered to give access to handle 32. Rod 30 is then lifted by means of handle 32 sufficiently to deposit ball 40 in receptacle 18 for the drop onto lens L. This completes the test. Removing and replacing the tested lens readies tester 10 for a repeat operation.

With drop ball tester 10 placed upon a work bench at normal tabletop height, access to both the lens support 16 and ball insertion opening 38 are within easy reach of an operating position forwardly of the tester 10.

I claim:

1. Drop ball apparatus for testing the frangibility of a lens comprising:

a base;

an elongated hollow tower extending vertically from said base;

lens supporting means within said tower adjacent said base;

a ball receptacle for receiving and guiding a ball to a drop point within said tower adjacent the uppermost end thereof;

said tower having a guideway extending vertically along one side thereof and a lift rod slidably contained within said guideway, said lift rod normally having its uppermost end disposed intermediately of the height of said tower when said rod is located at a predetermined lowermost position in said guideway; and said guideway having an access aperture adjacent said normally disposed end of said lift rod for receiving said test ball whereby movement of said lift rod upwardly in said guideway elevates said ball to said level of said receptacle for reception thereby and dropping onto a specimen lens when said lens is placed upon said lens supporting means.

2. Drop ball apparatus according to claim 1 further including guide means extending longitudinally throughout a major portion of the length of said tower from adjacent said drop point toward said lens supporting means.

3. Drop ball apparatus according to claim 1 wherein said tower has an enlarged opening adjacent said base for exposing said lens supporting means and a door normally covering said opening.

4. Drop ball apparatus according to claim 3 wherein said door is slidable along said tower upwardly away from said opening and downwardly over said opening.

5. Drop ball apparatus according to claim 4 further including hand grip means fixed to said lift rod for moving said rod upwardly and downwardly in said guideway and wherein said hand grip means is covered by said door when said door is in said upward position for exposing said lens supporting means.

* * * * *